US011040307B2

(12) United States Patent
England

(10) Patent No.: US 11,040,307 B2
(45) Date of Patent: Jun. 22, 2021

(54) METHOD FOR REMOVING CONTAMINANT FROM A FLUID STREAM

(71) Applicant: Purafil, Inc., Doraville, GA (US)

(72) Inventor: William G. England, Doraville, GA (US)

(73) Assignee: PURAFIL, INC., Doraville, GA (US)

( * ) Notice: Subject to any disclaimer, the term of this patent is extended or adjusted under 35 U.S.C. 154(b) by 0 days.

(21) Appl. No.: 15/413,492

(22) Filed: Jan. 24, 2017

(65) Prior Publication Data
US 2017/0216769 A1   Aug. 3, 2017

Related U.S. Application Data

(60) Provisional application No. 62/288,708, filed on Jan. 29, 2016.

(51) Int. Cl.
| B01D 53/72 | (2006.01) |
| B01D 53/02 | (2006.01) |
| B01J 20/02 | (2006.01) |
| B01J 20/20 | (2006.01) |
| B01J 20/32 | (2006.01) |

(52) U.S. Cl.
CPC .......... *B01D 53/72* (2013.01); *B01D 53/025* (2013.01); *B01J 20/02* (2013.01); *B01J 20/20* (2013.01); *B01J 20/3204* (2013.01); *B01J 20/3234* (2013.01); *B01D 2253/102* (2013.01); *B01D 2253/104* (2013.01); *B01D 2253/108* (2013.01); *B01D 2253/25* (2013.01); *B01D 2257/708* (2013.01)

(58) Field of Classification Search
None
See application file for complete search history.

(56) References Cited

U.S. PATENT DOCUMENTS

| 4,443,354 A * | 4/1984 | Eian .................. B01D 53/72 252/184 |
| 8,613,284 B2 * | 12/2013 | Hutchens ............ A24D 3/0212 131/202 |
| 8,945,277 B1 * | 2/2015 | Xiong ................ B01D 53/02 95/90 |
| 2009/0211453 A1 * | 8/2009 | Nassivera ............ B01D 53/58 96/153 |
| 2009/0227693 A1 * | 9/2009 | Kubota ................ A61L 9/01 521/29 |
| 2010/0296990 A1 * | 11/2010 | England .............. B01D 53/02 423/237 |
| 2012/0058885 A1 * | 3/2012 | Nebergall ............ B01F 5/205 502/80 |
| 2014/0255279 A1 * | 9/2014 | Olson ................ B01J 20/3234 423/210 |
| 2014/0261502 A1 * | 9/2014 | Kizer .................. A24D 3/16 131/332 |

FOREIGN PATENT DOCUMENTS

EP    1072737 A1 *  1/2001  ............ B01D 53/04

OTHER PUBLICATIONS

EP1072737A1 English Translation (Year: 2001).*

* cited by examiner

*Primary Examiner* — Anita Nassiri-Motlagh
(74) *Attorney, Agent, or Firm* — Kilpatrick Townsend & Stockton LLP

(57) ABSTRACT

A method for removing at least one contaminant from a fluid stream by filtering the fluid stream with a filtration medium. The filtration medium includes an impregnate. The impregnate includes a surfactant such as sulfamic acid. The medium has from about 0.1 to about 25% by weight of impregnate. The method is useful for removing one or more volatile organic compounds, particularly formaldehyde, from the fluid stream. In some embodiments, the method includes removing at least two volatile organic compound contaminants from the fluid stream.

17 Claims, No Drawings

METHOD FOR REMOVING CONTAMINANT FROM A FLUID STREAM

TECHNICAL FIELD

The present invention relates generally to compositions and methods for the removal of volatile organic compounds having disagreeable odors, toxic properties or corrosive properties from gaseous streams and more particularly relates to the use of air filtration media in filter beds.

BACKGROUND OF THE INVENTION

The removal of toxic, corrosive and odorous gases can be accomplished by a number of techniques. These may include wet scrubbing, incineration, and removal via gas-phase air filtration using a variety of dry scrubbing adsorptive, absorptive, and/or chemically impregnated media. As opposed to these other methods, gas-phase air filtration does not require the consumption of large quantities water or fuel. Dry-scrubbing media can be engineered from a number of common adsorbent materials with or without chemical additives for the control of a broad spectrum of gases or tailored for specific gases.

In contrast to the reversible process of physical adsorption, chemical adsorption, also referred to as chemisorption, is the result of chemical reactions on the surface of the media. This process is specific and depends on the physical and chemical nature of both the media and the gases to be removed. Some oxidation reactions can occur spontaneously on the surface of the adsorbent, however, a chemical impregnate is usually added to the media. The impregnate imparts a higher contaminant removal capacity and can lend some degree of specificity. Although some selectivity is apparent in physical adsorption, it can usually be traced to purely physical, rather than chemical, properties. In chemisorption, stronger molecular forces are involved, and the process is generally instantaneous and irreversible.

Undesirable airborne compounds such as volatile organic compounds (VOCs) occur in a number of environments, where most are primarily responsible for the presence of disagreeable odors or irritating or toxic gases. Such environments include municipal waste treatment facilities, paper mills, petrochemical refining plants, morgues, hospitals, anatomy laboratories, hotel facilities, museums, archives, computer and data storage rooms, and other commercial and industrial facilities. These undesirable airborne compounds can also come from building materials such as particle board fabricated using adhesives containing formaldehyde. These undesirable compounds may be bacterial breakdown products of higher organic compounds or simply byproducts of industrial processes.

Volatile organic compounds (VOCs) are organic compounds having a high vapor pressure at ordinary room temperature. Their high vapor pressure results from a low boiling point, which causes evaporation or sublimation of molecules from the liquid or solid form of the compound to enter the surrounding air. For example, formaldehyde, a VOC that evaporates from paint and adhesives, has a boiling point of only −19° C.

Numerous different VOCs exist. They are both human-made and naturally occurring. Most scents or odors are VOCs. Some VOCs are dangerous to human health or cause harm to the environment. Man-made VOCs are regulated by law, especially indoors, where concentrations are the highest. Harmful VOCs typically are not acutely toxic, but have compounding long-term health effects. Because the concentrations are usually low and the symptoms slowly develop, long-term adverse effects are difficult to predict.

A major source of man-made VOCs are adhesives and coatings, especially paints and protective coatings in which solvents are required to spread a protective or adhesive film. Typical solvents are aliphatic hydrocarbons, ethyl acetate, glycol ethers, and acetone. Another VOC, tetrachloroethene, is used widely in dry cleaning and other industries. The use of fossil fuels produces VOCs either directly as products (e.g., gasoline) or indirectly as byproducts (e.g., automobile exhaust gas). Another VOC, benzene, is a known human carcinogen. Benzene is found in environmental tobacco smoke, stored fuels, and exhaust from cars. The aromatic VOC compound benzene, emitted from exhaled cigarette smoke is labeled as carcinogenic, and is ten times higher in smokers than in nonsmokers. Benzene is frequently used to make other chemicals in the production of plastics, resins, and synthetic fibers. Benzene has also been known to contaminate food and water and, if digested, can lead to vomiting, dizziness, sleepiness, rapid heartbeat, and possibly death. Methylene chloride is another VOC that has been found to be dangerous to human health. It can be found in adhesive removers and aerosol spray paints, and the chemical has been proven to cause cancer in animals. In the human body, methylene chloride is converted to carbon monoxide, which is dangerous to human health. Perchloroethylene is a volatile organic compound that has been linked to cancer in animals. Perchloroethylene is used mostly in dry cleaning. While dry cleaners recapture perchloroethylene in the dry cleaning process to reuse it, some environmental release is unavoidable. Many building materials such as paints, adhesives, wall boards, and ceiling tiles slowly emit formaldehyde, which irritates the mucous membranes of humans and other animals. Formaldehyde emissions from wood are in the range of 0.02-0.04 ppm. Relative humidity within an indoor environment can also affect the emissions of formaldehyde. High relative humidity and high temperatures allow more vaporization of formaldehyde from wood-materials.

Since many people spend much of their time indoors, long-term exposure to VOCs in the indoor environment can contribute to sick building syndrome. In offices, VOC results from new furnishings, wall coverings, and office equipment such as photocopy machines, which can release VOCs into the air. New build construction contributes to the highest level of VOC off-gassing in an indoor environment because of the abundant new materials generating VOCs at the same time in such a short time period. VOC concentration in an indoor environment during winter is three to four times higher than the VOC concentrations during the summer.

Respiratory, allergic, or immune effects in infants or children are associated with VOCs and other indoor or outdoor air pollutants. Some VOCs, such as styrene and limonene, can react with nitrogen oxides or with ozone to produce new oxidation products and secondary aerosols, which can cause sensory irritation symptoms. Unspecified VOCs are important in the creation of smog. Adverse health effects caused by VOCs include eye, nose, and throat irritation; headaches, loss of coordination, nausea; and damage to the liver, kidney, and central nervous system. Some organics can cause cancer in animals; some are suspected or known to cause cancer in humans. Key signs or symptoms associated with exposure to VOCs include conjunctival irritation, nose and throat discomfort, headache, allergic skin reaction, dyspnea, declines in serum cholinesterase levels, nausea, vomiting, nose bleeding, fatigue, dizziness.

The ability of organic chemicals to cause health effects varies greatly from those that are highly toxic, to those with no known health effects. As with other pollutants, the extent and nature of the health effect will depend on many factors including level of exposure and length of time exposed. Eye and respiratory tract irritation, headaches, dizziness, visual disorders, and memory impairment are among the immediate symptoms that some people have experienced soon after exposure to some organics. At present, not much is known about what health effects occur from the levels of organics usually found in homes. Many organic compounds are known to cause cancer in animals; some are suspected of causing, or are known to cause, cancer in humans.

Formaldehyde ("$OCH_2$") is a colorless gas with a pungent, suffocating odor. It is present in morgues, anatomy laboratories and within buildings in which formaldehyde-containing adhesives are used in building materials, such as particle board. Because it is intensely irritating to mucous membranes, the control of formaldehyde is necessary.

Hydrogen sulfide ("$H_2S$"), a colorless, toxic gas with a characteristic odor of rotten eggs, is produced in coal pits, gas wells, sulfur springs and from decaying organic matter containing sulfur. Controlling emissions of this gas, particularly from municipal sewage treatment plants, has long been considered desirable. More recently, protecting electronic apparatus from the corrosive fumes of these compounds has become increasingly important. Furthermore, $H_2S$ is flammable.

Ammonia ("$NH_3$") is also a colorless gas. It possesses a distinctive, pungent odor and is a corrosive, alkaline gas. The gas is produced in animal rooms and nurseries, and its control also has long been considered important.

Attempts have been made to provide solid filtration media for removing the undesirable compounds described above from fluid, or moving, streams, such as gas or vapor streams. Although a variety of impregnated substrates are known for removing undesirable contaminants from fluid streams, these known impregnated substrates are highly selective, that is, each impregnate can treat only a specific type of compound. In applications where several undesirable compounds are present, the air filtration media would either need to have several impregnates included therein or several different air filtration media would need to be used. This results in the currently available media not meeting the needs of various industries.

The residential air quality industry has incorporated an absorbent composition containing two or more absorbent compounds into carpet and window blinds. This absorbent composition attempts to absorb numerous undesirable gaseous compounds that are present in household air, including formaldehyde (from plywood and furniture), organic solvents (from paint, adhesives and wallpaper), gases from insecticides, germicides, agricultural chemicals, and odors from cigarette smoke and pets. This absorbent composition has not, however, been applied to industrial, commercial or residential air filtration media.

Therefore, what is needed is an air filtration media having impregnated thereon a composition capable of absorbing multiple categories of undesirable gases, including formaldehyde.

SUMMARY OF THE INVENTION

A solid air filtration medium includes an impregnate, wherein the impregnate contains a surfactant. The medium contains from about 0.1 to about 25% by weight of impregnate. The impregnate includes from about 0.1 to about 10% by weight of the surfactant, such as sulfamic acid.

Methods for forming a solid air filtration medium include applying an impregnate to a porous substrate, wherein the impregnate includes a surfactant. The porous substrate is preferably activated alumina, silica gel, zeolite, kaolin, adsorbent clay, activated bauxite, activated carbon or combinations thereof.

Methods for removing a contaminant from a fluid stream include filtering the fluid stream with an air filtration medium comprising an impregnate, wherein the impregnate is a surfactant. The methods are useful for removing volatile organic compounds (VOCs), such as formaldehyde.

DETAILED DESCRIPTION OF THE INVENTION

Dry scrubbing air filtration media and methods of treating a fluid stream with the media are provided. The solid filtration media can be used to remove or reduce undesirable compounds, or contaminants, from a gaseous fluid stream. The solid filtration media contains an impregnate, which is a surfactant. The impregnate preferably, but does not have to be, applied to the air filtration media as a liquid impregnate solution.

Generally described, the filtration media contain a substrate impregnated with an impregnate that is composed of a solution containing a surfactant. A preferred surfactant is sulfamic acid. The filtration media include approximately 0.1 to about 25% by weight of the impregnate.

When applied to the filtration media, the surfactant allows the media to remove or reduce undesirable compounds, or contaminants, from a gaseous fluid stream. In particular, the filtration media can remove a volatile organic compound (VOC), or a combination of undesirable volatile organic compounds, particularly, but not limited to, formaldehyde. Previously known air filtration media have been unable to effectively and efficiently achieve this level of volatile organic compound filtration.

The surfactant component of the filtration media is believed to react with formaldehyde according to formula (I):

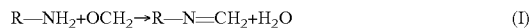

$$R-NH_2+OCH_2 \rightarrow R-N=CH_2+H_2O \tag{I}$$

The gaseous formaldehyde is thus converted to a solid organic nitrogen compound.

The surfactant also neutralizes the formaldehyde by catalyzing the breakdown of formaldehyde into water and carbon dioxide. The surfactant is not consumed in the catalytic reaction and is available to treat additional undesirable compounds.

The porous substrate to which the impregnate solution is applied may be selected from the group consisting of, but not limited to, activated alumina ($Al_2O_3$) (UOP Chemical, Baton Rouge, La.), silica gels (J. M. Huber, Chemical Division, Havre De Grace, Md.), zeolites (Steel Head Specialty Minerals, Spokane, Wash.), kaolin (Englehard Corp., Edison, N.J.), adsorbent clays (Englehard Corp., Edison, N.J.), activated bauxite, activated carbon such as activated carbon cloth, woven or nonwoven particulate filters or combinations thereof. Preferably, the concentration of impregnate in the filtration media is about 0.1 to about 25% by weight.

Preferred porous substrates include alumina, activated carbon, and combinations thereof. Another preferred porous substrate is a combination of alumina and a zeolite. Though not intending to be bound by this statement, it is believed that zeolites further control the moisture content of the filtration media by attracting and holding water, which functions to keep more of the impregnate in solution. This effect, in turn, is believed to improve the capacity and efficiency of the filtration media. As used herein, the term zeolite includes natural silicate zeolites, synthetic materials and phosphate minerals that have a zeolite-like structure. Examples of zeolites that can be used in this media include, but are not limited to, amicite (hydrated potassium sodium aluminum silicate), analcime (hydrated sodium aluminum silicate), pollucite (hydrated cesium sodium aluminum silicate), boggsite (hydrated calcium sodium aluminum silicate), chabazite (hydrated calcium aluminum silicate), edingtonite (hydrated barium calcium aluminum silicate), faujasite (hydrated sodium calcium magnesium aluminum silicate), ferrierite (hydrated sodium potassium magnesium calcium aluminum silicate), gobbinsite (hydrated sodium potassium calcium aluminum silicate), harmotome (hydrated barium potassium aluminum silicate), phillipsite (hydrated potassium sodium calcium aluminum silicate), clinoptilolite (hydrated sodium potassium calcium aluminum silicate), mordenite (hydrated sodium potassium calcium aluminum silicate), mesolite (hydrated sodium calcium aluminum silicate), natrolite (hydrated sodium aluminum silicate), amicite (hydrated potassium sodium aluminum silicate), garronite (hydrated calcium aluminum silicate), perlialite (hydrated potassium sodium calcium strontium aluminum silicate), barrerite (hydrated sodium potassium calcium aluminum silicate), stilbite (hydrated sodium calcium aluminum silicate), thomsonite (hydrated sodium calcium aluminum silicate), and the like. Zeolites have many related phosphate and silicate minerals with cage-like framework structures or with similar properties as zeolites, which may also be used in place of, or along with, zeolites. These zeolite-like minerals include minerals such as kehoeite, pahasapaite, tiptopite, hsianghualite, lovdarite, viseite, partheite, prehnite, roggianite, apophyllite, gyrolite, maricopaite, okenite, tacharanite, tobermorite, and the like.

Terms such as "filtration media", "adsorbent composition," "chemisorbent composition," and "impregnated substrate" are all interchangeable, and denote a substance that is capable of reducing or eliminating the presence of unwanted contaminants in fluid streams by the contact of such a substance with the fluid stream. It is to be understood that the term "fluid" is defined as a liquid or gas capable of flowing, or moving in a particular direction, and includes gaseous, aqueous, organic containing, and inorganic containing fluids.

The porous substrate can also be a woven or nonwoven material such as glass fiber, crepe paper, Kraft paper, wool, steel wool, silk, cellulosic fiber fabrics, synthetic fiber fabrics or combinations thereof. Preferred cellulosic fiber fabrics include cotton, linen, viscose and rayon. Preferred synthetic fiber fabrics include nylon, rayon, polyester, polyethylene, polypropylene, polyvinyl alcohol, acrylics, acetates, polyamide and carbon fiber.

As discussed above, the impregnate could be, but does not have to be, applied to the filtration media as a liquid impregnate solution. The liquid solution could be sprayed onto the filtration media or could be applied by other known methods.

Alternatively, the impregnate could be provided as a powder. The powder could be applied directly to the filtration media, or water or another liquid could be added to the powder to hydrate it prior to application of the impregnate composition onto the filtration media.

In addition, for extruded or pelletized filtration media (such as activated alumina or activated carbon-based media), the powder to could be added directly to the alumina/carbon/etc. material prior to its extrusion or pelletization. The impregnate would thus be more or less evenly distributed throughout the media, in contrast to media which has had a liquid impregnate sprayed onto its outer surfaces.

Specific methods of applying liquid or powder impregnate compositions onto air filtration media are known and are not important to the invention described herein.

Contaminant Removal Methods

Also provided is a method of treating a contaminated fluid stream using the dry scrubbing filtration media described herein. This method involves contacting the contaminated fluid stream with the solid filtration composition provided herein. Typically, the undesired contaminants will be removed from air, especially from air admixed with effluent gas streams resulting from municipal waste treatment facilities, paper mills, petrochemical refining plants, morgues, hospitals, anatomy laboratories, hotel facilities, museums, archives, computer and data storage rooms, and other commercial and industrial facilities. The filtration media is particularly useful in residential applications to reduce fumes from VOCs, such as formaldehyde. A liquid or powder impregnate could be sold to a consumer for manual application to a filter by the consumer. Methods of treating gaseous or other fluid streams are well known in the art. Any method known in the art of treating fluid streams with the media described herein may be used.

Some exemplary embodiments of the present invention will now be illustrated in the following specific, non-limiting example.

EXAMPLE

Air filtration media containing the impregnate solutions described herein have been shown to be much more efficient at removing gaseous VOC contaminants, particularly formaldehyde.

The filtration media is a 4 mm activated carbon porous substrate impregnated with the surfactant, sulfamic acid. As compared against known sodium permanganate-based filtration media, for example, the filtration media described herein has shown the following improved filtration capabilities and works better that other filter mediums:

| PRODUCTS TESTED | Breakthrough Time | | Breakthrough Capacity |
|---|---|---|---|
| | minutes | hours | % by weight |
| Surfactant Impregnate on 4 mm Activated Carbon (AC) | 1,388 | 23.13 | 4.45% |
| PURAFIL SP - 1/16" | 1,191 | 19.85 | 2.48% |
| 200 Series | 746 | 12.43 | 1.56% |
| AC/4 + IA/4 | 358 | 5.97 | 1.22% |
| PURAFIL AP - 1/16" | 270 | 4.50 | 0.57% |
| HCOH media - alumina based | 293 | 4.88 | 0.56% |
| HCOH media - carbon based | 121 | 2.02 | 0.30% |

Purafil SP media - activated alumina pellets impregnated with sodium permanganate
200 Series - activated carbon impregnated with manganese oxide
AC/4 + IA4 - activated carbon impregnated with potassium carbonate
Purafil AP - 1/16" - activated alumina impregnated with potassium iodine
HCOH media - alumina based, activated alumina no impregnate
HCOH media - carbon based, activated carbon no impregnate Test method: The filtration capacity of each media tested was determined according to the principles described in ASTM D6646-01, "Standard Test Method for Determination of the Accelerated Hydrogen Sulfide Breakthrough Capacity of Granular and Pelletized Activated Carbon." This test method is directed at filtration of hydrogen sulfide, but in this example was adapted for formaldehyde. Test Method ASTM D6646 is as follows:

ASTM D6646 Standard Test Method for Determination of the Accelerated Hydrogen Sulfide Breakthrough Capacity of Granular and Pelletized Activated Carbon.

Scope: This test method is intended to evaluate the performance of virgin, newly impregnated or in-service, granular or pelletized activated carbon for the removal of hydrogen sulfide from an air stream, under the laboratory test conditions described herein. A humidified air stream containing 1% (by volume) hydrogen sulfide is passed through a carbon bed until 50 ppm breakthrough of $H_2S$ is observed. The $H_2S$ adsorption capacity of the carbon per unit volume at 99.5% removal efficiency (g $H_2S/cm^3$ carbon) is then calculated. This test is not necessarily applicable to non-carbon adsorptive materials.

It should be understood, of course, that the foregoing relates only to certain embodiments of the present invention and that numerous modifications or alterations may be made therein without departing from the spirit and the scope of the invention. All of the publications or patents mentioned herein are hereby incorporated by reference in their entireties.

I claim:

1. A method for removing a combination of two or more contaminants from a fluid stream comprising filtering the fluid stream with a filtration medium, wherein the filtration medium comprises an impregnate consisting of sulfamic acid and wherein at least one of the contaminants is formaldehyde.

2. The method of claim 1, wherein at least one of the contaminants is hydrogen sulfide.

3. The method of claim 1, wherein at least one of the contaminants is a volatile organic compound other than formaldehyde.

4. The method of claim 1, wherein the medium comprises from about 0.1 to about 25% by weight of impregnate.

5. The method of claim 1, wherein the filtration medium further comprises a porous substrate.

6. The method of claim 5, wherein the porous substrate is selected from the group consisting of activated alumina, silica gel, zeolite, kaolin, adsorbent clay, activated bauxite, activated carbon, and combinations thereof.

7. The method of claim 5, wherein the porous substrate is activated alumina, activated carbon, or a combination thereof.

8. The method of claim 5, wherein the porous substrate is activated alumina, zeolite, or a combination thereof.

9. The method of claim 5, wherein the filtration medium is formed by applying the impregnate to the porous substrate.

10. The method of claim 9, wherein the impregnate is applied to the porous substrate in the form of a liquid solution.

11. The method of claim 5, wherein the impregnate is sprayed onto the porous substrate.

12. The method of claim 5, wherein the impregnate is applied to the porous substrate in the form of a powder.

13. The method of claim 5, wherein the impregnate is incorporated into the porous substrate prior to extrusion or pelletization of the substrate.

14. The method of claim 5, wherein the porous substrate is a woven or nonwoven material selected from the group consisting of glass fiber, crepe paper, kraft paper, wool, steel wool, silk, cellulosic fiber fabrics, synthetic fiber fabrics, and combinations thereof.

15. The method of claim 1, wherein at least one of the contaminants is ammonia.

16. The method of claim 1, wherein removal of the combination of two or more contaminants from a fluid stream also removes disagreeable odors.

17. The method of claim 1, wherein the surfactant neutralizes the formaldehyde by catalyzing the breakdown of formaldehyde into water and carbon dioxide, the surfactant is not consumed in the catalytic reaction, and the surfactant is available to remove the combination of two or more contaminants wherein at least one of the contaminants is formaldehyde.

* * * * *